United States Patent
Huang et al.

(10) Patent No.: US 10,663,814 B2
(45) Date of Patent: May 26, 2020

(54) LIQUID CRYSTAL PANEL

(71) Applicant: SHARP KABUSHIKI KAISHA, Sakai, Osaka (JP)

(72) Inventors: Szu-Chi Huang, Sakai (JP); Junichi Morinaga, Sakai (JP); Katsuya Ogawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/227,350

(22) Filed: Dec. 20, 2018

(65) Prior Publication Data
US 2019/0196275 A1    Jun. 27, 2019

(30) Foreign Application Priority Data
Dec. 22, 2017 (JP) .................... 2017-245940

(51) Int. Cl.
*G02F 1/1343* (2006.01)
*G02F 1/1362* (2006.01)

(52) U.S. Cl.
CPC .. *G02F 1/134363* (2013.01); *G02F 1/136213* (2013.01); *G02F 2001/134318* (2013.01); *G02F 2001/134372* (2013.01)

(58) Field of Classification Search
CPC ... G02F 1/134363; G02F 2001/134372; G02F 1/136213; G02F 2001/134381
See application file for complete search history.

(56) References Cited

U.S. PATENT DOCUMENTS

| | | | | |
|---|---|---|---|---|
| 6,028,653 A | * | 2/2000 | Nishida | G02F 1/134363 349/141 |
| 6,297,867 B1 | * | 10/2001 | Miyahara | G02F 1/1345 349/141 |
| 2007/0052899 A1 | * | 3/2007 | Lin | G02F 1/134363 349/141 |
| 2011/0109862 A1 | * | 5/2011 | Harada | G02F 1/134363 349/141 |
| 2011/0216280 A1 | * | 9/2011 | Itou | G02F 1/134363 349/143 |
| 2014/0138693 A1 | * | 5/2014 | Ham | G02F 1/134309 257/59 |
| 2014/0375921 A1 | * | 12/2014 | Moriya | G02F 1/136227 349/43 |
| 2017/0168354 A1 | * | 6/2017 | Jiang | G02F 1/133512 |

FOREIGN PATENT DOCUMENTS

JP    2002-258306 A    9/2002

* cited by examiner

*Primary Examiner* — Thanh Nhan P Nguyen
(74) *Attorney, Agent, or Firm* — ScienBiziP, P.C.

(57) ABSTRACT

A liquid crystal panel includes pixel electrodes and a common electrode. The common electrode is disposed to overlap the pixel electrodes. A wire is connected to the common electrode. The common electrode includes a first region and a second region. The first region includes first openings. The second region includes second openings. The second region is located farther away from a point of connection with the wire than the first region. The second openings are smaller in area than the first openings.

6 Claims, 9 Drawing Sheets

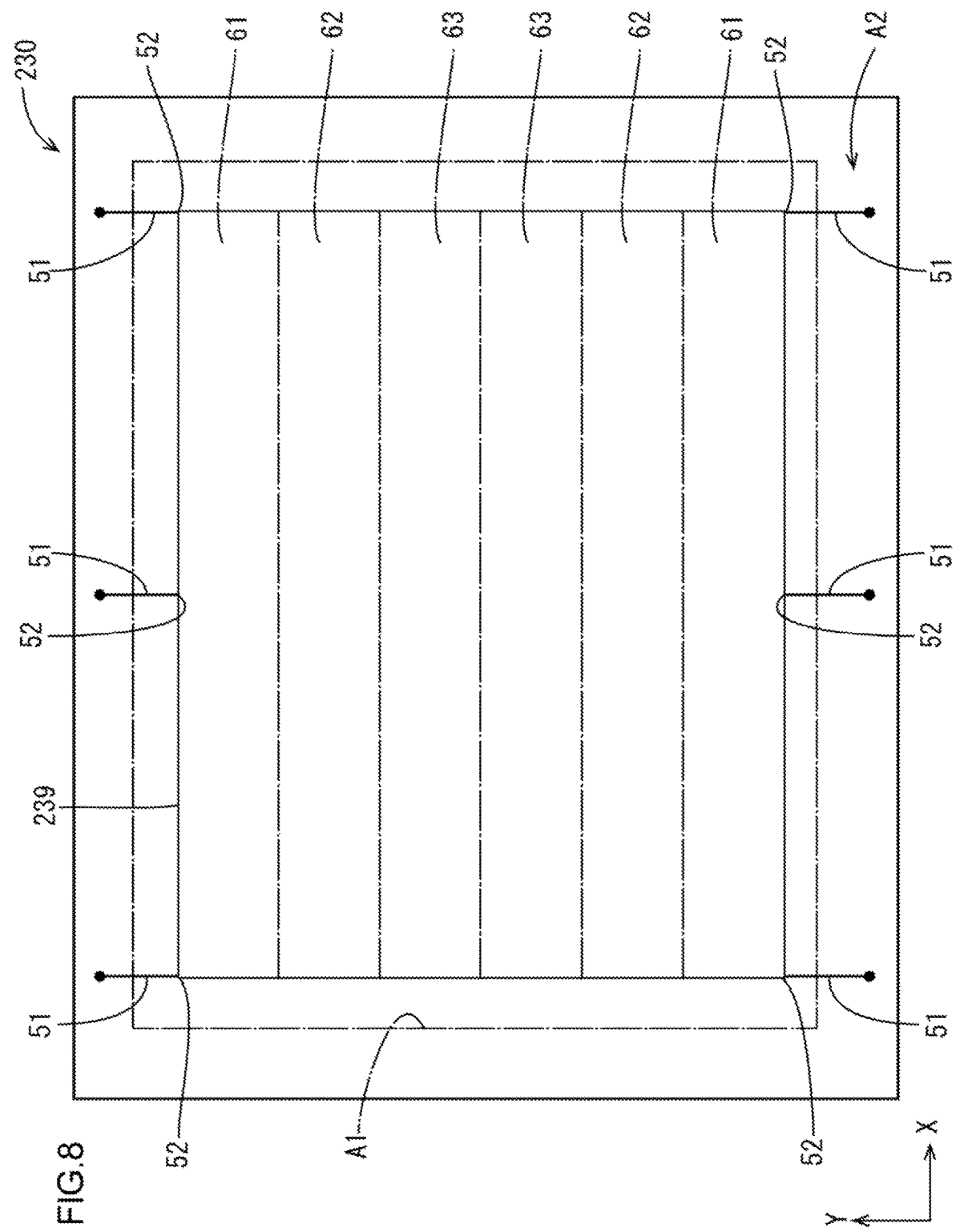

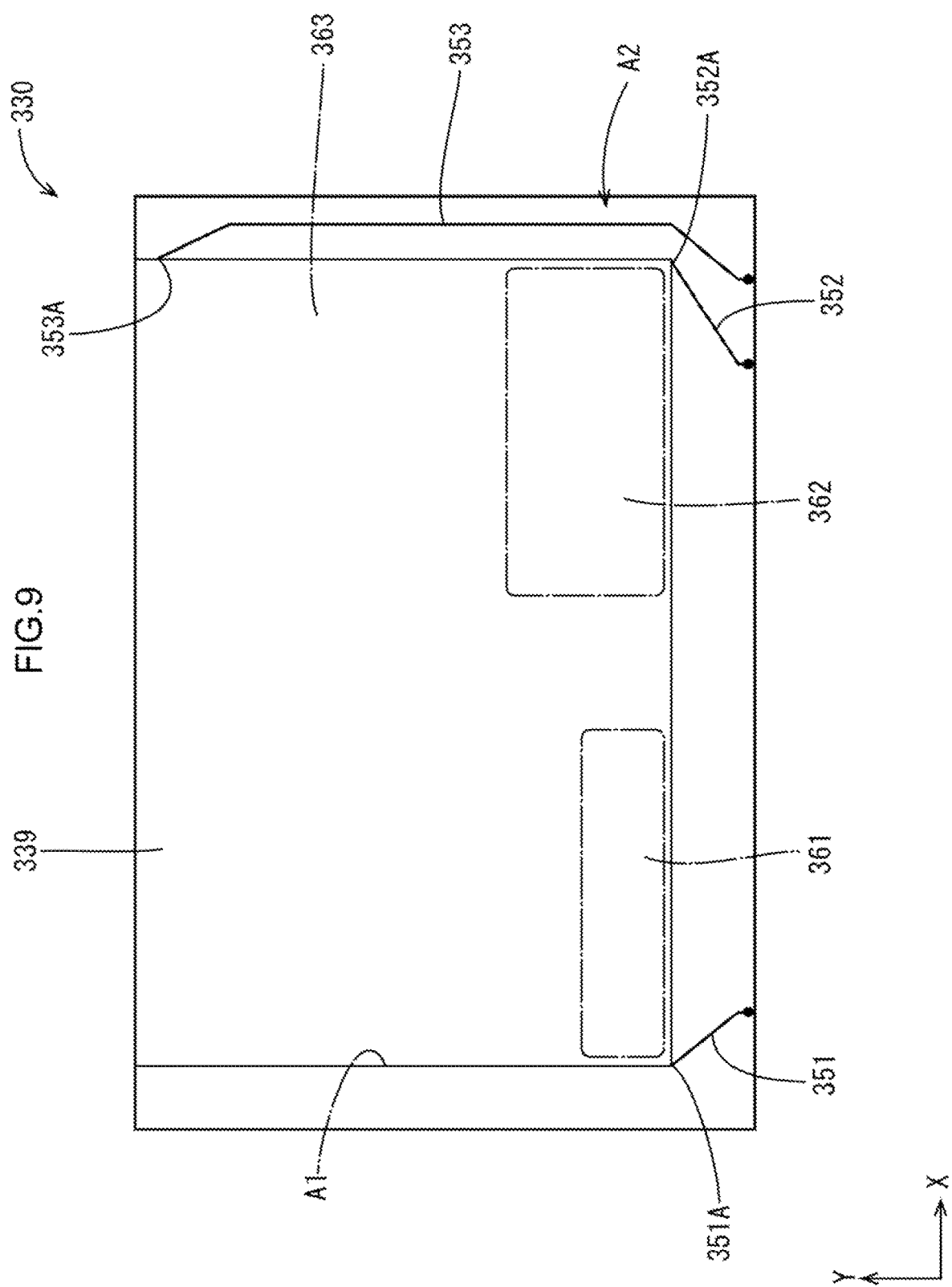

ical characteristic of the pixels is much higher as compared with, for example, a horizontal electric field mode such as an in-plane switching (IPS) mode or a fringe-field switching (FFS) mode. It should be noted that the following description takes a vertical direction in each of FIGS. 2 to 4 as a Y-axis direction and a horizontal direction in each of FIGS. 2 to 4 as an X-axis direction.

LIQUID CRYSTAL PANEL

CROSS REFERENCE TO RELATED APPLICATION

This application claims priority from Japanese Patent Application No. 2017-245940 filed on Dec. 22, 2017. The entire contents of the priority application are incorporated herein by reference.

TECHNICAL FIELD

The technology described herein relates to a liquid crystal panel.

BACKGROUND

There has conventionally been known a liquid crystal panel including a common electrode that covers pixels (see Japanese Unexamined Patent Application Publication No. 2002-258206). In Japanese Unexamined Patent Application Publication No. 2002-258306, an electric field is formed by a pixel electrode and the common electrode so that a state of orientation of liquid crystals can be controlled.

In such a configuration including a common electrode, a common signal is supplied to the common electrode via a wire. Note here that since a place in the common electrode that is far from a point of connection with the wire is higher in load on the common signal than a place in the common electrode that is close to the point of connection, a delay in the common signal tends to occur in the place in the common electrode that is far from the point of connection. This results in an inhomogeneous distribution of voltage on the common electrode, raising concern about a decrease in display quality.

SUMMARY

The technology described herein was made in view of the above circumstances. An object is to attain a further enhancement in display quality.

A liquid crystal panel includes pixel electrodes and a common electrode. The common electrode is disposed to overlap the pixel electrodes. A wire is connected to the common electrode. The common electrode includes a first region and a second region. The first region includes first openings. The second region includes second openings. The second region is located farther away from a point of connection with the wire than the first region. The second openings are smaller in area than the first openings.

In a case where a common signal is supplied from a wire to a common electrode, the common electrode becomes higher in electric resistance and higher in load on the common signal with distance from a point of connection in the common electrode with the wire. Meanwhile, in a case where an opening is formed in a predetermined region in the common electrode, the common electrode becomes larger in area and lower in electric resistance in that region and therefore becomes lower in load on the common signal as the opening becomes smaller in area. This makes it possible to reduce a delay (blunting) in the common signal in the second region by making the openings (second openings) of the second region, which is a region that is farther from the point of connection with the wire than the first region, smaller in area than the openings (first openings) of the first region, thus making it possible to attain a further enhancement in display quality.

According to the technology described herein, a further enhancement in display quality can be attained.

BRIEF DESCRIPTION OF THE DRAWINGS

FIG. 8 is a plan view schematically illustrating an array substrate according to a second embodiment.

FIG. 9 is a plan view schematically illustrating an array substrate according to a third embodiment.

DETAILED DESCRIPTION

First Embodiment

Figure 1:
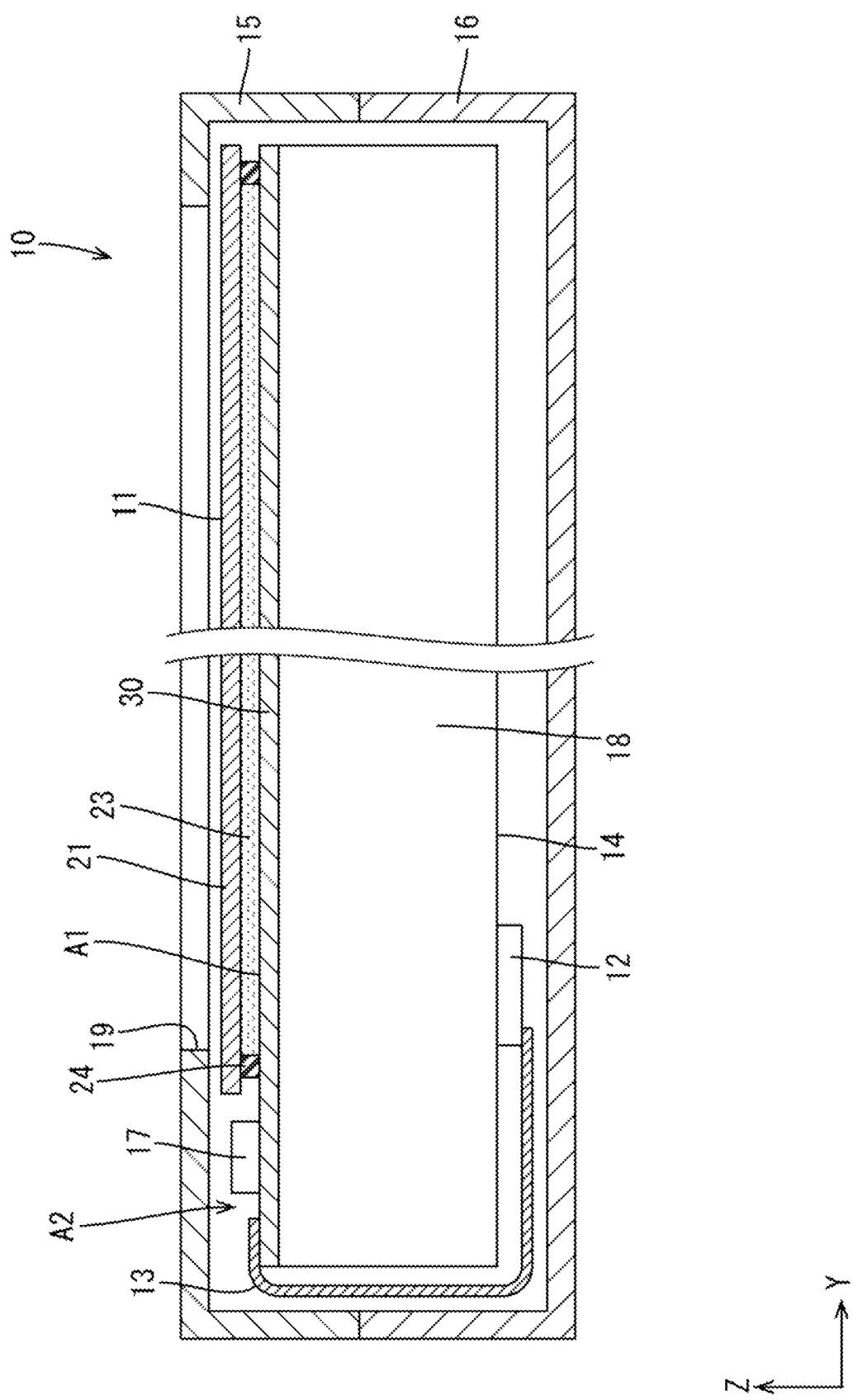
FIG. 1 is a cross-sectional view schematically illustrating a liquid crystal panel according to a first embodiment.

A first embodiment will be described with reference to FIGS. 1 to 7. As illustrated in FIG. 1, a liquid crystal display apparatus 10 includes a liquid crystal panel 11 (display panel), a control circuit substrate 12 that supplies various types of input signal to a driver 17 of the liquid crystal panel 11, flexible substrate 13 that electrically connects the liquid crystal panel 11 to the external control circuit substrate 12, and a backlight device 14 (lighting device) serving as a light source that supplies light to the liquid crystal panel 11. As illustrated in FIG. 1, the backlight device 14 includes a chassis 18, formed in a substantially box shape, that has an opening facing frontward (toward the liquid crystal panel 11), a light source (such as a cold-cathode tube, an LED, organic electroluminescence; not illustrated) disposed in the chassis 18, and an optical member (not illustrated) disposed to cover the opening of the chassis 18. The optical member has a function of, for example, converting light emitted from the light source into planar light. The liquid crystal panel 11 has a display region A1 where an image can be displayed and a non-display region A2 that surrounds the display region A1.

Further, as illustrated in FIG. 1, the liquid crystal display apparatus 10 includes a pair of front and back exterior members 15 and 16 in which to accommodate the liquid crystal panel 11 and the backlight device 14, and the front exterior member 15 has an opening 19 through which to see from outside an image displayed on the display region A1 of the liquid crystal panel 11. The liquid crystal display apparatus 10 according to the first embodiment is used, for example, in various types of electronic equipment (not illustrated) such as mobile phones (including smartphones), lap-top computers (including tablet lap-top computers), wearable terminals (including smartwatches), portable information terminals (including electronic books and PDAs), portable game machines, and digital photo frames.

Figure 3:
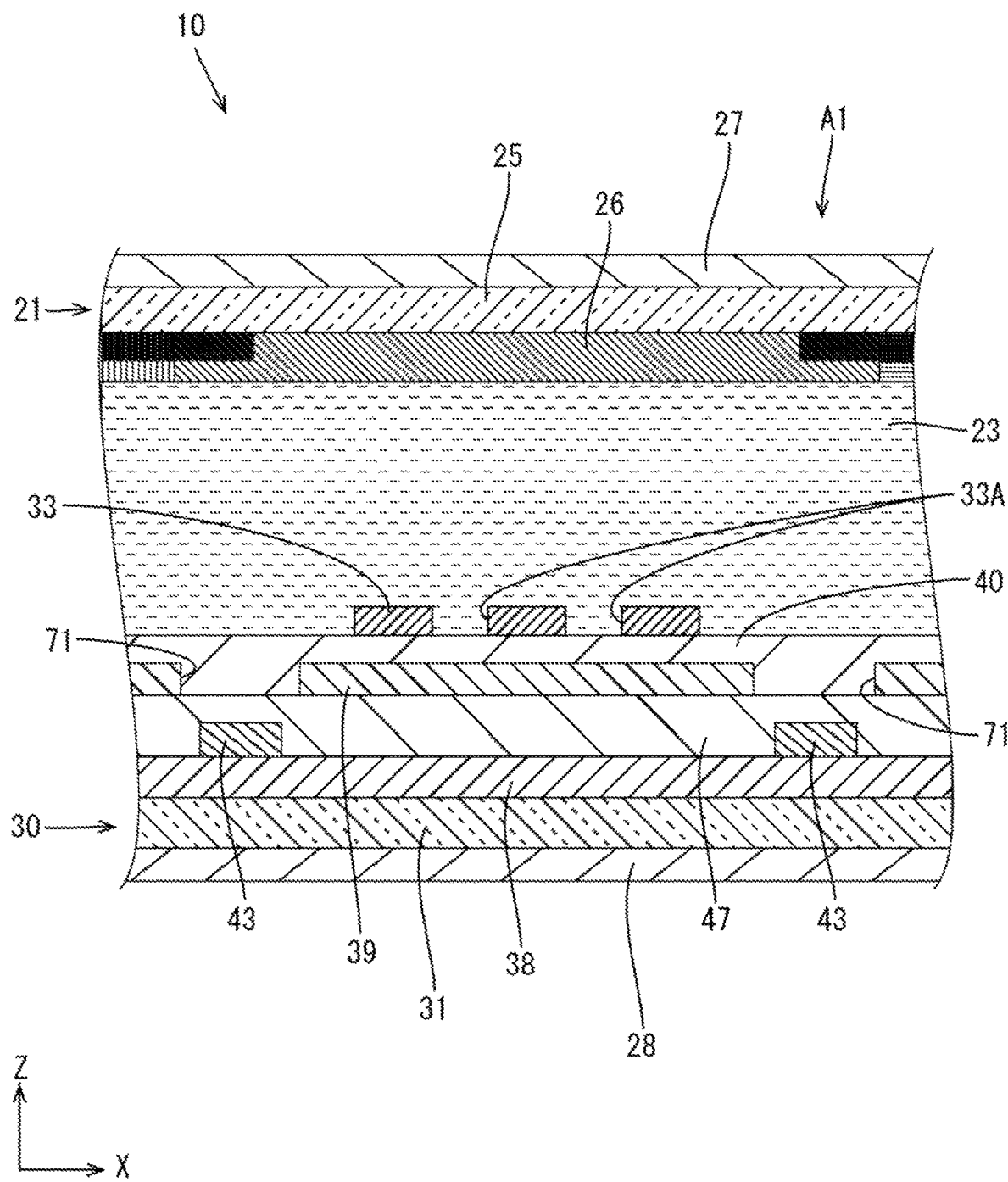
FIG. 3 is a cross-sectional view illustrating the liquid crystal panel as taken along line III-III of FIG. 2.

As illustrated in FIG. 1, the liquid crystal panel 11 includes a pair of substrates 21 and 30 disposed in an opposed state, a liquid crystal layer 23 (medium layer), disposed between the substrates 21 and 30, that contains liquid crystal molecules constituting a substance whose optical properties vary along with the application of an electric field, and a sealing member 24, disposed between the substrates 21 and 30, that seals in the liquid crystal layer 23 by surrounding the liquid crystal layer 23. The substrates 21 and 30 include a front substrate (front side, upper side of FIG. 1) serving as a CF substrate 21 and a back (rear) substrate serving as an array substrate 30 (active matrix substrate, element substrate, first substrate). Examples of orientation of the liquid crystal molecules contained in the liquid crystal layer 23 include, but are not limited to, horizontal orientation. As illustrated in FIG. 3, the CF substrate 21 (second substrate) is configured by stacking a color filter 26 and the like on an inner surface of a glass substrate 25 (that faces the liquid crystal layer 23). The color filter 26 has colored portions of three colors of R (red), G (green), and blue (B) arranged in a matrix. Each of the colored portions is placed opposite the corresponding one of pixels of the array substrate 30. Further, polarizing plates 27 and 28 are joined to outer surfaces of the substrates 21 and 30, respectively.

Figure 2:
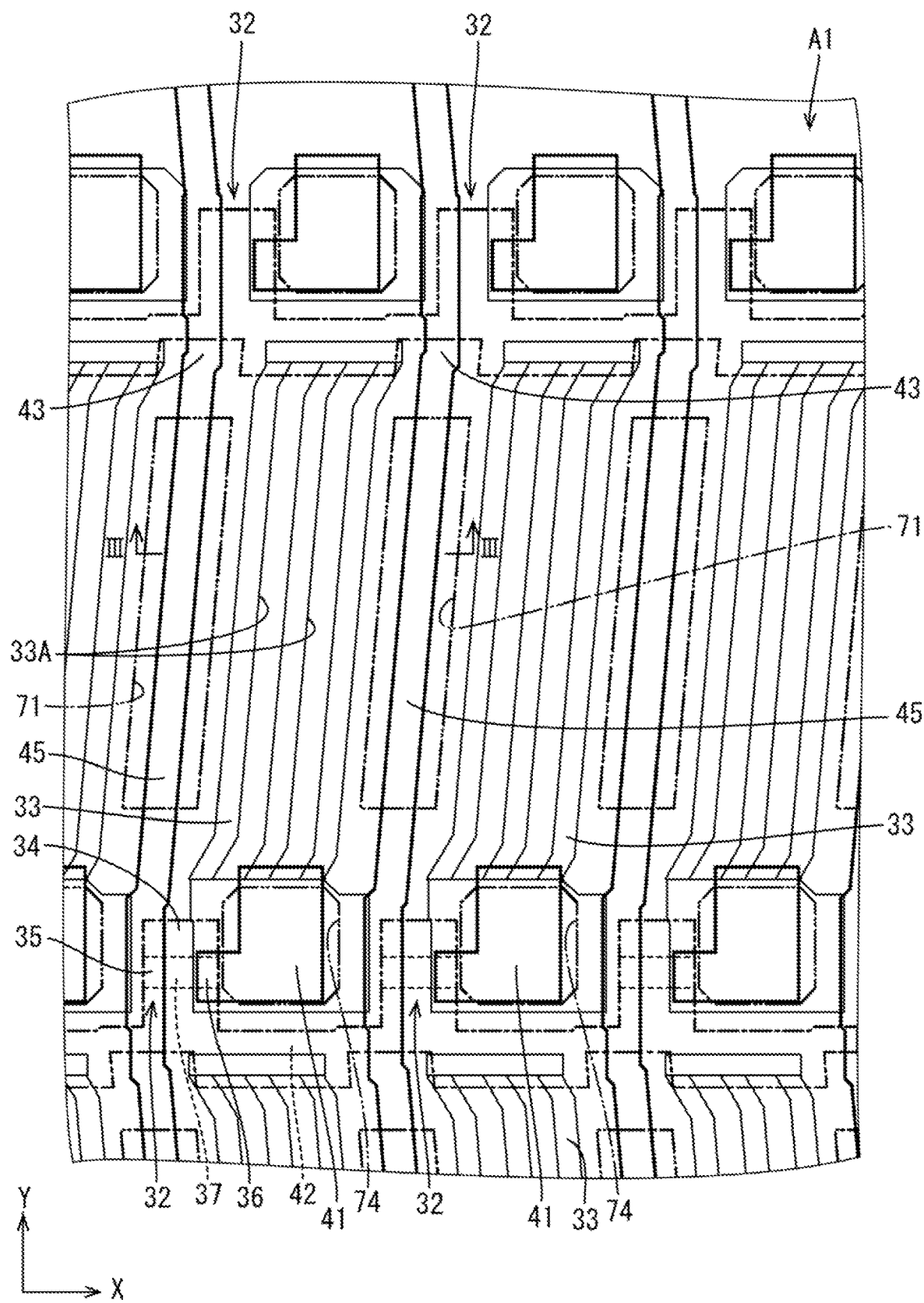
FIG. 2 is a plan view illustrating pixels of an array substrate constituting the liquid crystal panel.

As illustrated in FIG. 3, the array substrate 30 is one obtained by lamination forming of various types of film on an inner surface of a glass substrate 31 by a photolithography process. As illustrated in FIG. 2, TFTs 32 (thin-film transistors: display elements) serving as switching elements and pixel electrodes 33 are provided on the inner surface of the glass substrate 31 in the display region A1. The pixel electrodes 33 are arranged in a matrix (i.e. in rows and columns) in the display region A1.

The TFTs 32 are provided on a lower level than the pixel electrodes 33. The TFTs 32 are arranged in a matrix (i.e. in rows and columns) in the display region A1. Each of the TFTs 32 is connected to the corresponding one of the pixel electrodes 33. Each of the TFTs 32 has a gate electrode 34, a source electrode 35, a drain electrode 36, and a channel section 37. The channel section 37 is disposed to overlap the gate electrode 34. Further, a gate insulating layer 38 (see FIG. 3) is sandwiched between the channel section 37 and the gate electrode 34. The channel section 37 is disposed to join the source electrode 35 to the drain electrode 36. The source electrode 35 and the drain electrode 36 are disposed on the same level as source wires 43 illustrated in FIG. 3, and as illustrated in FIG. 3, a planarizing film 47 is stacked on a higher level than that level. Examples of materials of laminated films that constitute the gate electrode 34, the source electrode 35, and the drain electrode 36 include, but are not limited to, titanium (Ti) and copper (Cu).

Figure 4:
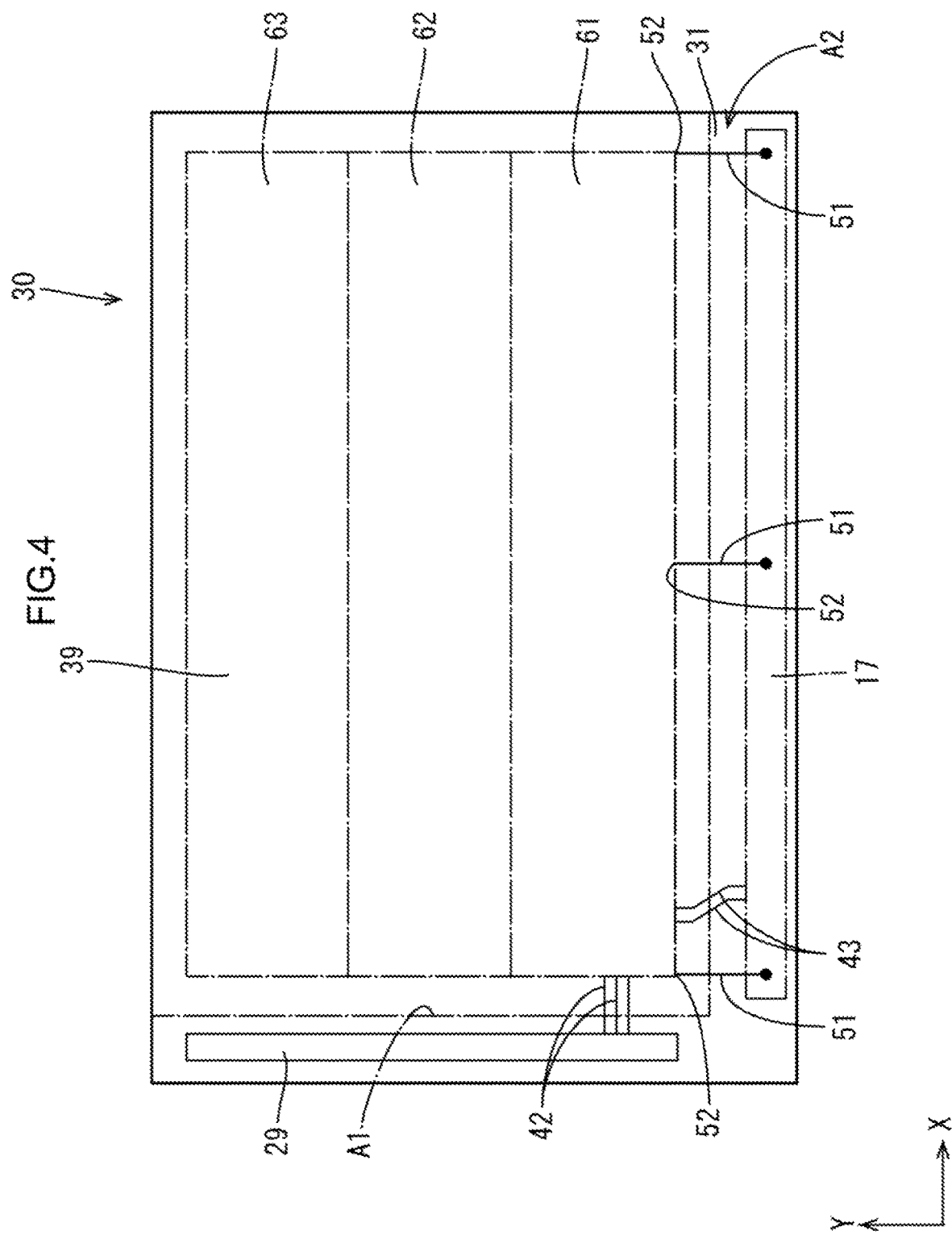
FIG. 4 is a plan view schematically illustrating the array substrate.

As illustrated in FIG. 2, gate wires 42 and source wires 43 are disposed in gridlike fashion around the TFTs 32 and the pixel electrodes 33. The gate electrode 34 is connected to a gate wire 42, and the source electrode 35 is connected to a source wire 43. Connected to the drain electrode 36 is a drain wire 41 that is electrically connected to the corresponding one of the pixel electrodes 33 via a contact hole (not illustrated). Further, as illustrated in FIG. 4, the array substrate 30 has one side (region extending along an X-axis direction, part of the non-display region A2) provided with the driver 17 and another side (region extending along a Y-axis direction, part of the non-display region A2) provided with a gate driver 29. The TFTs 32 are driven in accordance with signals that are supplied from the driver 17 to the source wires 43 and signals that are supplied from the gate driver 29 to the gate wires 42, and along with the driving, the supply of potentials to the pixel electrodes 33 is controlled.

As illustrated in FIG. 3, a common electrode 39 is formed on the planarizing film 47. The common electrode 39 is provided on the back side of the pixel electrodes 33, and an insulating film 40 is sandwiched between the pixel electrodes 33 and the common electrode 39. Examples of materials of laminated films that constitute the gate insulating film 38 and the insulating film 40 include, but are not limited to, silicon dioxide ($SiO_2$) and silicon nitride ($SiN_x$). Examples of materials of transparent electrode films that constitute the pixel electrodes 33 and the common electrode 39 include, but are not limited to, ITO (indium tin oxide) and IZO (indium zinc oxide).

Further, each of the pixel electrodes 33 has, for example, slits 33A formed therein. If a potential difference is generated between the pixel electrode 33 and the common electrode 39, which overlap each other, along with charging of the pixel electrode 33, a fringe field (oblique field) including a component normal to a board surface of the array substrate 30 as well as a component parallel to the board surface of the array substrate 30 is generated between opening edges of the slits 33A of the pixel electrode 33 and the common electrode 39, so that a state of orientation of liquid crystal molecules contained in the liquid crystal layer 23 can be controlled by utilizing the fringe electric field. That is, an operation mode of the liquid crystal panel 11 according to the first embodiment is an FFS (fringe field switching) mode.

As illustrated in FIG. 4, the common electrode 39 is disposed over substantially the whole area of the display region A1. That is, the common electrode 39 is disposed to overlap the pixel electrodes 33. The common electrode 39 has for example a rectangular shape elongated in the X-axis direction. The common electrode 39 has one side (outer end) facing the driver 17 to which wires 51 (common wires) for supplying a common signal to the common electrode 39 are connected. The wires 51 are disposed at both ends of and in a central part of the common electrode 39 in the X-axis direction, respectively. Each of the wires 51 is connected to the driver 17. This results in a configuration in which a common signal for maintaining the common electrode 39 at a fixed reference potential is supplied from the driver 17 to the common electrode 39.

In the first embodiment, the wires 51 are connected to one side of the common electrode 39. For this reason, the common electrode 39 becomes higher in electric resistance and higher in load on the common signal with distance from places of connection 52 in the common electrode 39 with the wires 51. As a result, it is conceivable that a delay in the common signal may occur in a region that is far from the places of connection 52 with the wires 51. To address this problem, the first embodiment is configured such that a delay in the common signal is reduced by dividing the common electrode 39 into three regions as illustrated in FIG. 4.

Figure 5:
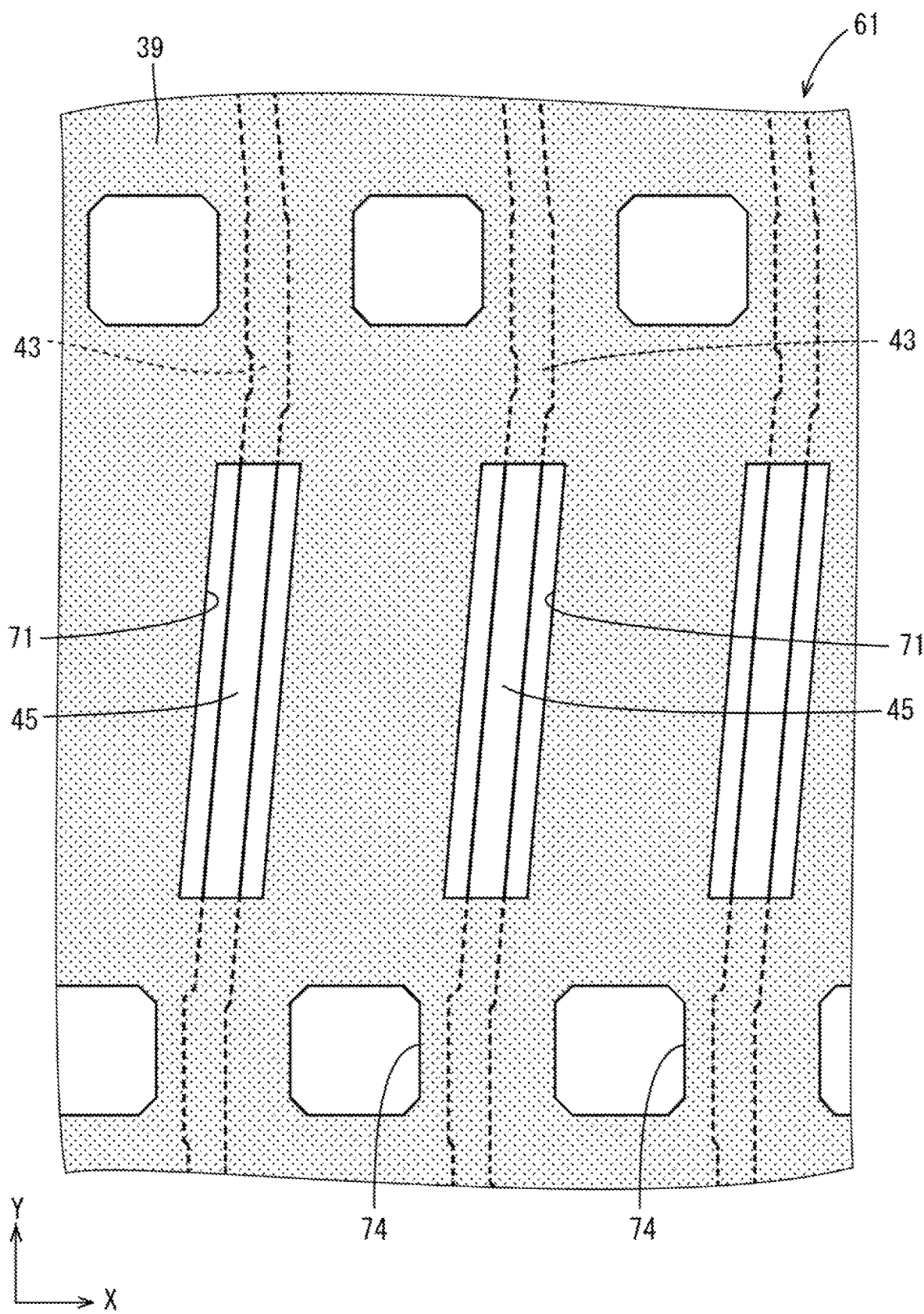
FIG. 5 is a plan view illustrating a first region of a common electrode.

In the first embodiment, the common electrode 39 is divided into three regions, namely a first region 61, a second region 62, and a third region 63. The first region 61, the second region 62, and the third region 63 each has a longitudinal shape elongated in the X-axis direction (direction of one side of the common electrode), and are arranged in the descending order of the first region 61, the second region 62, and the third region 63 by proximity to the places of connection 52 with the wires 51. As illustrated in FIG. 5, the first region 61 of the common electrode 39 has first openings 71 formed therein to overlap source wires 43. Each of the first openings 71 has a longitudinal shape extending along the direction of extension of the corresponding one of the source wires 43. Each of the source wires 43 has an extension portion 45 extending in a direction slightly tilted with respect to the Y-axis direction, and the corresponding one of the first openings 71 is disposed to overlap the extension portion 45. That is, the first opening 71 extends along the direction of extension of the extension portion 45. Each of the first openings 71 is provided in correspondence with the corresponding one of source wires 43 arranged in the X-axis direction. For this reason, the first openings 71 are arranged along a longitudinal direction (X-axis direction) of the first region 61. It should be noted that FIG. 2 is a plan view corresponding to the first region 61. Further, the extension portions 45 are arranged along the direction of extension of the source wires 43. That is, the first openings 71 are arranged along the direction of extension of the source wires 43 in the first region 61.

Figure 6:
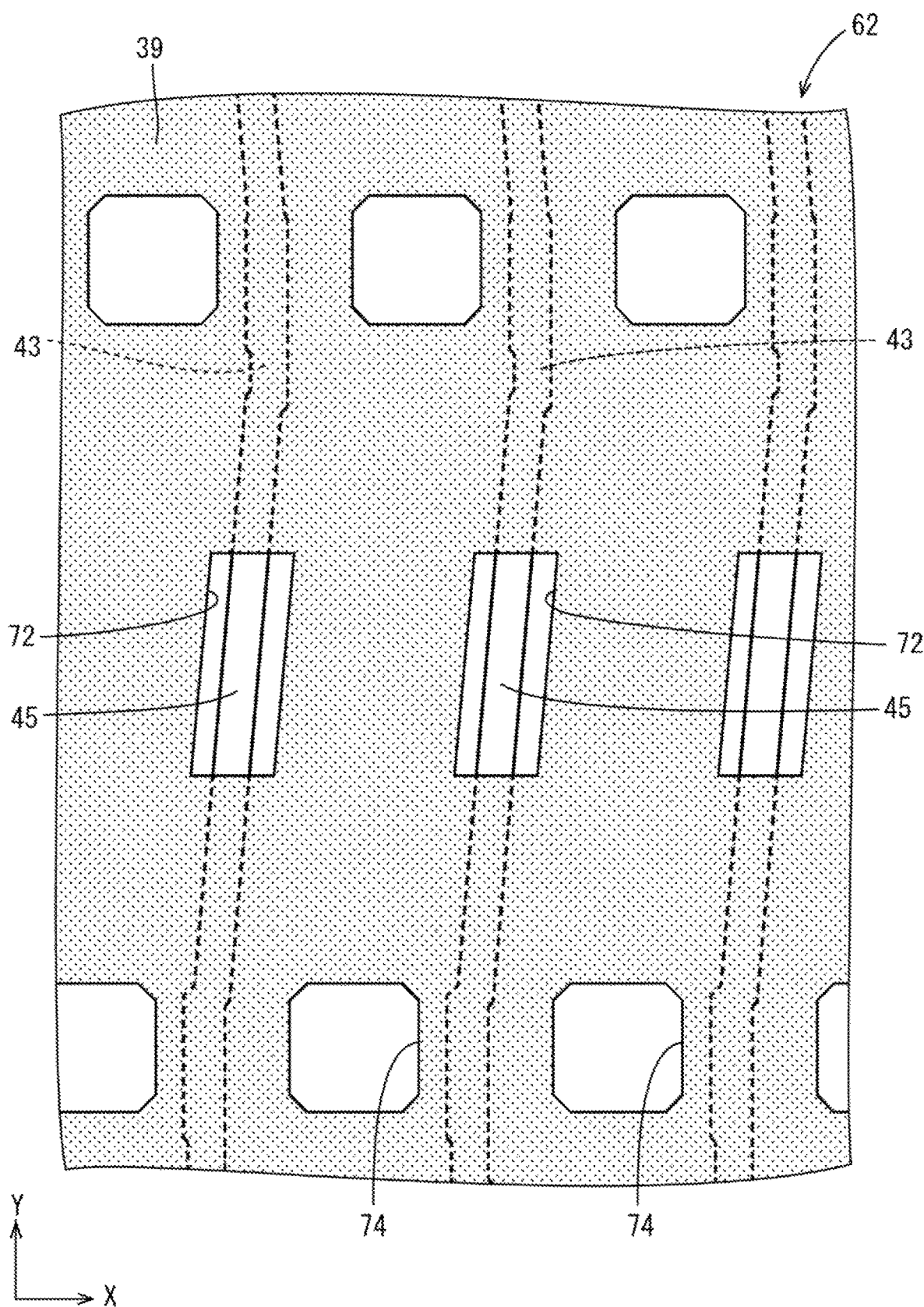
FIG. 6 is a plan view illustrating a second region of the common electrode.

The second region 62 of the common electrode 39 is placed on a farther side from the places of connection 52 with the wires 51 than the first region 61. As illustrated in FIG. 6, the second region 62 has second openings 72 formed therein to overlap source wires 43. Each of the second openings 72 has a longitudinal shape extending along the direction of extension of the corresponding one of the source wires 43. The second opening 72 is disposed to overlap the extension portion 45 of the source wire 43. That is, the second opening 72 extends along the direction of extension of the extension portion 45. Each of the second openings 72 is provided in correspondence with the corresponding one of the source wires 43. For this reason, the second openings 72 are arranged along a longitudinal direction of the second region 62. Moreover, the second openings 72 are set to have smaller values of length in the direction of extension of the source wires 43 than the first openings 71. Further, the first openings 71 and the second opening 72 are set to have the same width. For this reason, the second openings 72 are smaller in area than the first openings 71. The second openings 72 are arranged along the direction of extension of the source wires 43 in the second region 62.

Figure 7:
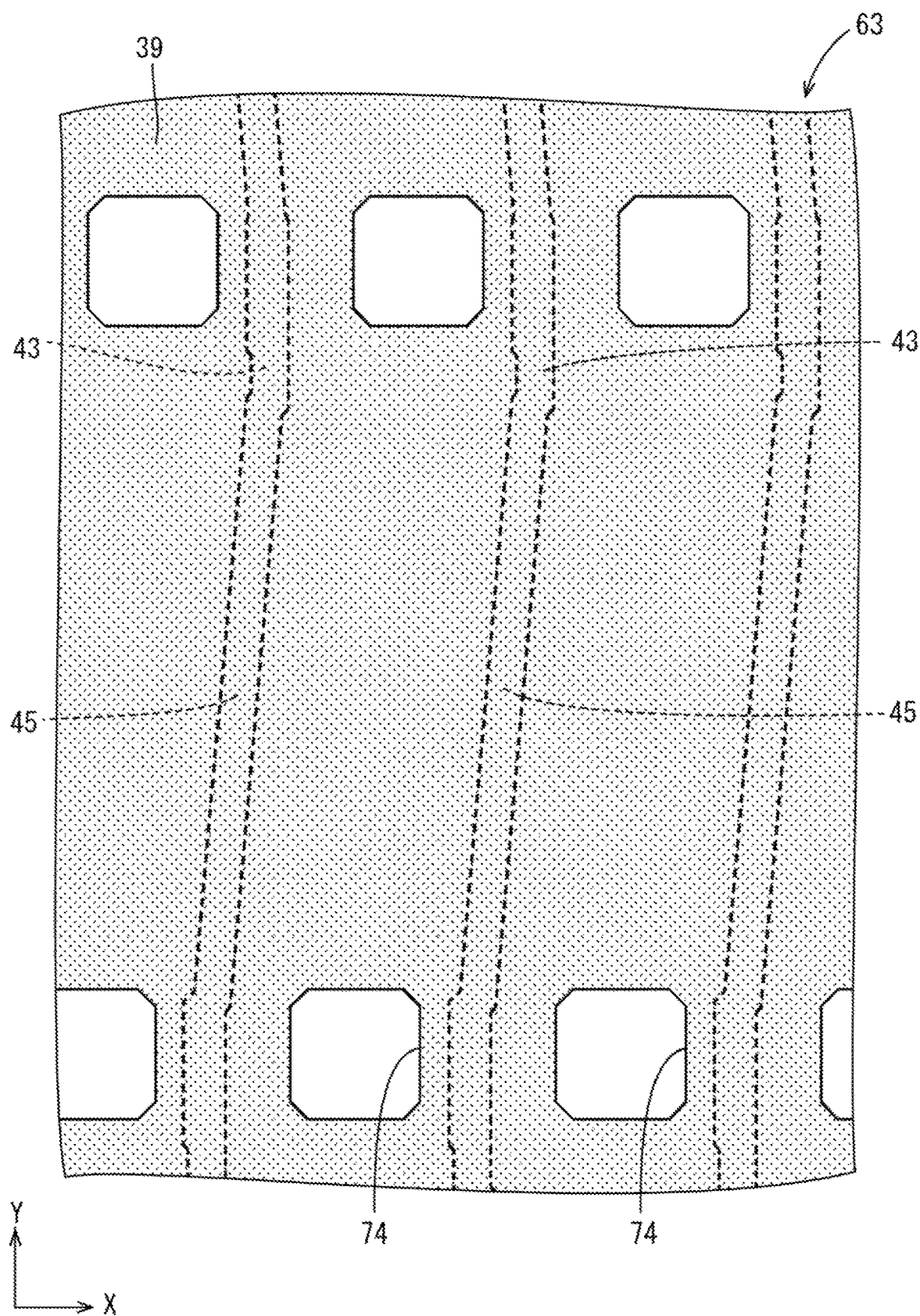
FIG. 7 is a plan view illustrating a third region of the common electrode.

The third region 63 of the common electrode 39 is placed on a farther side from the places of connection 52 with the wires 51 than the second region 62. As illustrated in FIG. 7, the third region 63 has no openings formed in places that overlap source wires 43. Thus, in the first embodiment, openings (a pattern of first openings 71 and a pattern of second openings 72) are arranged in rows and columns on the common electrode 39, and those openings which are farther from the places of connection 52 with the wires 51 are smaller in area. Further, substantially rectangular openings 74 are formed in places in the common electrode 39 that overlap drain wires 41. The openings 74 are formed to prevent a short circuit between the pixel electrodes 33 and the common electrode 39 in connecting the pixel electrodes 33 to the drain wires 41 via contact holes (not illustrated).

Next, effects of the first embodiment are described. In a case where a common signal is supplied from a wire to a common electrode, the common electrode becomes higher in electric resistance and higher in load on the common signal with distance from a point of connection in the common electrode with the wire. Meanwhile, in a case where an opening is formed in a predetermined region in the common electrode, the common electrode becomes larger in area and lower in electric resistance in that region and therefore becomes lower in load on the common signal as the opening becomes smaller in area. For this reason, the first embodiment makes it possible to reduce a delay (blunting) in the common signal in the second region by making the openings (second openings 72) of the second region 62, which is a region that is farther from the places of connection 52 with the wires 51 than the first region 61, smaller in area than the openings (first openings 71) of the first region 61, thus making it possible to attain a further enhancement in display quality. Furthermore, as for the third region 63, which is a region that is farther from the places of connection 52 with the wires 51 than the second region 62, a delay in the common signal in the third region 63 can be reduced by not providing openings.

Further, the TFTs 32, each of which is connected to the corresponding one of the pixel electrodes 33, and the source wires 43 connected to the TFTs 32 are provided, and the first openings 71 and the second openings 72 are each formed to overlap the corresponding one of the source wires 43. Providing the openings (i.e. the first openings 71 and the second openings 72) in places that overlap the source wires 43 makes it possible to reduce the occurrence of parasitic capacitance between the source wires 43 and the common electrode 39, thus making it possible to attain a further enhancement in display quality.

Further, the first openings 71 and the second openings 72 each have a longitudinal shape extending along the direction of extension of the corresponding one of the source wires 43, and the second openings 72 are smaller in length in the direction of extension of the source wires 43 than the first openings 71. Making the second openings 72 smaller in length than the first openings 71 makes it possible to make the second openings 72 smaller in area than the first openings 71.

Further, the array substrate 30, the CF substrate 21 placed opposite the array substrate 30, and the liquid crystal layer 23 sandwiched between the array substrate 30 and the CF substrate 21 are provided, and the source wires 43 and the common electrode 39 are provided in the array substrate 30. Although the foregoing configuration is shorter in distance between the source wires 43 and the common electrode 39 and more likely to suffer from parasitic capacitance between the source wires 43 and the common electrode 39 than a configuration in which the common electrode 39 is provided in the CF substrate 21, the foregoing configuration is suitable, as it makes it possible to reduce the occurrence of parasitic capacitance between the source wires 43 and the common electrode 39 by providing the openings (i.e. the first openings 71 and the second openings 72) in places that overlap the source wires 43.

Second Embodiment

Next, a second embodiment will be described with reference to FIG. 8. A repeated description is omitted by assigning the same signs to components which are the same as those of the first embodiment. The second embodiment differs in configuration of an array substrate from the first embodiment. In an array substrate 230 of the second embodiment, as illustrated in FIG. 8, three wires 51 for supplying a common signal to a common electrode 239 are connected to either end of the common electrode 239 in the Y-axis direction. In the second embodiment, the common electrode 239 is divided into six regions so that a first region 61, a second region 62, and a third region 63 are arranged in this order from each of the ends to which the wires 51 are connected toward the center of the common electrode 239 in the Y-axis direction. That is, central parts of the common electrode 239 in the Y-axis direction that are farthest from the wires 51 serve as third regions 63. In a case where wires 51 are disposed at either end of the common electrode 239 in the Y-axis direction, such a configuration makes it possible to reduce a delay in the common signal, thus making it possible to attain a further enhancement in display quality.

Third Embodiment

Next, a third embodiment will be described with reference to FIG. 9. A repeated description is omitted by assigning the same signs to components which are the same as those of the first embodiment. The third embodiment differs in configuration of an array substrate from the first and second embodiments. As illustrated in FIG. 9, an array substrate 330 of the third embodiment includes wires 351, 352, 353 for supplying a common signal to a common electrode 339. The wires 351 and 352 are disposed at one end of the array substrate 330 in the Y-axis direction. The wires 351 and 352 are connected to corners of the common electrode 339 that are located close to the wires 351 and 352, respectively. The wire 352 (second wire, which is a wire that is different from the wire) is longer than the wire 351, and the wire 352 is higher in electric resistance than the wire 351.

Further, a point of connection 351A between the wire 351 and the common electrode 339 is located closer to a first region 361 than to a second region 362, and a point of connection 352A between the wire 352 and the common electrode 339 is located closer to the second region 362 than to the first region 361. In the third embodiment, the first region 361 of the common electrode 339 is eccentrically-located toward the wire 351, and the second region 362 of the common electrode 339 is eccentrically-located toward the wire 352. Moreover, a region on the common electrode 339 other than the first region 361 and the second region 362 serves as a third region 363. Further, the wire 353 is connected at a point of connection 353A near a corner of the common electrode 33 that is located farther away from the wires 351 and 352. The wire 353 is disposed to extend mainly in the Y-axis direction, and is disposed at one end of the non-display region A2 of the array substrate 330 in the X-axis direction. The wire 353 is longer than the wire 352, and the wire 353 is higher in electric resistance than the wire 352.

One end of each of the wires 351, 352, and 353 opposite to the common electrode 339 is disposed at one end of the array substrate 330. By supplying the common signal from each of the wires 351, 352, and 353 to the common electrode 339, a delay in the common signal due to the distance from a point of connection with a wire can be better reduced than in a configuration in which a common signal is supplied from a single wire alone. However, in such a case as the foregoing configuration where the wire 352 is higher in electric resistance than the wire 351, a delay in the common signal tends to occur in the second region 362 due to the electric resistance of the wires. The foregoing configuration is suitable, as it makes it possible to reduce a delay in the common signal by making the second region 362 smaller in opening area than the first region 361.

For example, by making the wires 351 and 352 equal in electric resistance to each other, a delay in the common signal due to the electric resistance of the wires can be reduced. However, since the electric resistance of the wires depends on width and length, it is necessary to adjust the width and length of the wires 351 and 352 in order to make them equal in electric resistance to each other. This causes a decrease in degree of freedom of design of the wires. The foregoing configuration, in which a delay in the common signal can be reduced by setting the opening area, eliminates the need to adjust the width and length of the wires 351 and 352 in order to make the wires 351 and 352 (the wire and the second wire) equal in electric resistance to each other, thus making it possible to further increase the degree of freedom of design. Further, although the wire 353 is a wire that is longer than and higher in electric resistance than the wire 352, a delay in the common signal can be suitably reduced, as the wire 353 is connected to the third region 363, which has no openings formed therein.

Other Embodiments

The technology described herein is not limited to the embodiments described above with reference to the drawings. The following embodiments may be included in the technical scope.

(1) The common electrode may alternatively be disposed in the CF substrate.

(2) The first openings 71 and the second openings 72 may alternatively be disposed to overlap wires other than the source wires 43 disposed on the display region A1 of the array substrate. Further, each of the first and second openings 71 and 72 need only overlap at least a part of the corresponding one of the source wires 43.

(3) The shapes and arrangements of the first and second openings 71 and 72 are not limited to those illustrated in the foregoing embodiments. The second openings need only be larger in area than and may be different in shape from the first openings.

(4) The ranges of formation and arrangements of the first region (region having the first openings 71 formed therein), the second region (region having the second openings 72 formed therein), and the third region (region having no openings formed to overlap source wires) may be altered as appropriate and need only be set so that the distribution of voltage on the common electrode comes close to homogeneity when a common signal is supplied to the common electrode. The common electrode may alternatively be divided into only two regions (a first region and a second region). Alternatively, the common electrode may be divided into four or more regions that need only become smaller in opening area with distance from a point of connection between a wire and the common electrode.

(5) The electric resistance of the wire 352 needs only be set at a higher value than the electric resistance of the wire 351.

The invention claimed is:

1. A liquid crystal panel including a display region and a non-display region surrounding the display region, the liquid crystal panel comprising:
    a plurality of pixel electrodes disposed in the display region;
    a common electrode disposed to overlap the plurality of pixel electrodes, the common electrode including a first region and a second region, the first region including a plurality of first openings, the second region including a plurality of second openings smaller in area than the first openings; and
    a wire disposed in the non-display region and configured to supply a common signal to the common electrode, wherein
    the second region is located farther away from a point of connection with the wire than the first region.

2. The liquid crystal panel according to claim 1, further comprising:
    a plurality of switching elements connected to the plurality of pixel electrodes, respectively; and
    source wires connected to the switching elements, wherein each of the first and second openings is formed to overlap at least a part of a corresponding one of the source wires.

3. The liquid crystal panel according to claim 2, wherein the first and second openings have longitudinal shapes extending along a direction of extension of the source wires, respectively, and the second openings are smaller in length in the direction of extension of the source wires than the first openings.

4. The liquid crystal panel according to claim 2, further comprising:

a first substrate;

a second substrate disposed opposite the first substrate; and a liquid crystal layer sandwiched between the first substrate and the second substrate, wherein the source wires and the common electrode are included in the first substrate.

5. The liquid crystal panel according to claim 1, further comprising another wire that is different from the wire and connected to the common electrode, wherein the point of connection with the wire is located closer to the first region than to the second region, the other wire is connected to the common electrode at a point of connection closer to the second region than to the first region, and the other wire has electric resistance greater than the wire.

6. The liquid crystal panel according to claim 1, wherein the common electrode is disposed over substantially a whole area of the display region.

\* \* \* \* \*